United States Patent [19]

Graf

[11] Patent Number: 5,805,745
[45] Date of Patent: Sep. 8, 1998

[54] METHOD FOR LOCATING A SUBJECT'S LIPS IN A FACIAL IMAGE

[75] Inventor: Hans Peter Graf, Lincroft, N.J.

[73] Assignee: Lucent Technologies Inc., Murray Hill, N.J.

[21] Appl. No.: 494,900

[22] Filed: Jun. 26, 1995

[51] Int. Cl.[6] .............................. G06K 9/36; G06K 9/00; G06K 9/62; G06K 9/56
[52] U.S. Cl. .......................... 382/291; 348/15; 382/118; 382/156; 382/170; 382/195; 382/205; 382/224; 382/260; 382/279; 382/282; 382/286; 382/308
[58] Field of Search ................................... 382/115, 117, 382/118, 190, 191, 192, 194, 195, 279, 286, 308, 155, 156, 159, 260–264, 205, 282, 224, 170, 291; 348/14, 15, 17, 18, 19, 20, 22, 389

[56] References Cited

U.S. PATENT DOCUMENTS

| | | | |
|---|---|---|---|
| 4,791,675 | 12/1988 | Deering et al. | 382/308 |
| 4,873,567 | 10/1989 | Tsinberg | 348/389 |
| 4,975,969 | 12/1990 | Tal | 382/2 |
| 5,008,946 | 4/1991 | Ando | 382/117 |
| 5,179,419 | 1/1993 | Palmquist et al. | 382/108 |
| 5,263,096 | 11/1993 | Yu et al. | 382/308 |
| 5,450,504 | 9/1995 | Calia | 382/118 |
| 5,557,686 | 9/1996 | Brown et al. | 382/115 |

OTHER PUBLICATIONS

"Origin Approach for the Localisation of Objects in Images"; R. Vaillant, C. Monrocq and Y. LeCun; IEE Proc.–Vis. Image Signal Process, vol. 141, No. 4, pp. 245–250, Aug. 1994.

"Final Report to NSF of the Standards for Facial Animation Workshop"; Catherine Pelachaud, Norman Badler and Marie–Luce Viaud; University of Pennsylvania, PA; Presented at Workshop, Oct. 1994.

"Extraction of Facial Images from a Complex Background Using SGLD Matrices"; Ying Dai, Yasuaki Nakano, Hidetoshi Miyao; Dept. of Information Engineering, Shinshu Univ., 500 Wakasato, Nagano Japan; Presented at the International Conference on Pattern Recognition Oct. 1994, IEEE, pp. 137–141, 1994.

"A Visual Interaction System Using Real–Time Face Tracking"; Chil–Woo Lee, Akitoshi Tsukamoto, Kazuya Hirota and Saburo Tsuji; Conference Record of the Asilomar Conference on Signals, Systems & Computers, Pacific Grove, CA, pp. 1282–1286, Oct. 30 –Nov. 2, 1994.

"Face Image Recognition Using Artificial"; Neural Networks; Barry Flower and Hans Peter Graf, Technical Report, Nov. 14, 1994.

"Speech–Assisted Video Processing"; Tsuhan Chen, Hans Peter Graf, Homer Chen, Wu Chou, Barry Haskell, Eric Petajan, and Yao Wang, Bell Laboratories Document, Dec. 28, 1994.

"Lip Modeling For Visual Speech Recognition"; Ram R. Rao, Russell M. Mersereau, Georgia Institute of Technology, Atlanta, GA, Presented at the Asilomar Conference on Signals, Systems & Computers, Pacific Grove, CA, pp. 1–4, 1994.

(List continued on next page.)

*Primary Examiner*—Bipin Shalwala
*Attorney, Agent, or Firm*—Christopher N. Malvone

[57] ABSTRACT

An embodiment of the present invention locates facial features in an image by bandpass filtering the image and then performing morphological operations followed by a thresholding operation. This initial processing identifies candidate areas where facial features may be located. The candidate areas are evaluated by classifiers to determine if a facial feature, such as an eye or mouth, has been located.

6 Claims, 5 Drawing Sheets

OTHER PUBLICATIONS

"Using Deformable Templates to Infer Visual Speech Dynamics"; Marcus E. Hennecke, Stanford University, Stanford, CA; K. Venkatesh Prasad and David G. Stork, Ricoh California Research Center, Menlo Park, CA, Presented at the Asilomar Conference on Signals, Systems & Computers, Pacific Grove, CA, pp. 1–5, 1994.

"On Improving Eye Feature Extraction Using Deformable Templates"; X. Xie, R. Sudhakar and H. Zhuang, Boca Raton, FL, Pattern Recognition, vol. 27 No. 6, pp. 791–799, Jun. 1994.

"Continuous Optical Automatic Speech Recognition by Lipreading"; Alan J. Goldschen, Oscar N. Garcia, (EECS Department, George Washington University, Washington, DC), and Eric Petajan, (ATT Bell Laboratories, Murray Hill, NJ); Presented at the Asilomar Conference on Signals, Systems & Computers, Pacific Grove, CA, pp. 1–6, 1994.

"Lipreadable Wire–frame Animation Driven By Speech Parameters"; F. Lavagetto, D.I.S.T. University of Genova Italy, Presented at ICSIPNN '94 International Conference on Speech, Image Processing and Neural Networks, IEEE Apr. 1994.

"Sexnet: A Neural Network Identifies Sex From Human Faces"; B. A. Golomb, D. T. Lawrence, and T. J. Sejnowski, The Salk Institute, LaJolla, CA; Advances In Neural Information Processing, pp. 572–577, Nov. 1990.

"Analysis and Synthesis of Facial Image Sequences Using Physical And Anatomical Models"; Demetri Terzopoulos and Keith Waters, IEEE, pp. 569–579, 1993.

"A Face Recognition Method Using Higher Order Local Autocorrelation and Multivariate Analysis"; T. Kurita (Electrotechnical Lab, Tsukuba, Japan), N. Otsu and T. Sato (OITA–AIST Joint Research Center 1977 Nakahanda, Oita, Japan). IEEE, pp. 213–216, Apr. 1992.

"Human Facial Feature Extraction for Face Interpretation and Recognition"; Chung–Lin Huang and Ching–Wen Chen, Institute of Electrical Engineering National Tsing Hua, University of Hsin Chu, Taiwan, Rep. of China. IEEE, pp. 204–207, Apr. 1992.

"3D Facial Image Analysis For Human Identification"; Takashi Nagamine, Tetsuya Uemura and Isao Masuda, SECOM Intelligent Systems Laboratory, Shimorenjaku, Mitaka, Tokyo, Japan. IEEE, pp. 324–327, Apr. 1992.

"An Accurate and Robust Face Identification Scheme"; Shigeru Akamatsu (ATR Human Information Processing Research Laboratories), Tsutomu Sasaki, Nobuhiko Masui and Yasuhito Suenaga (NTT Human Interface Laboratories), and Hideo Fukamachi (NTT Software Corporation). IEEE, pp. 217–220, 1992.

"Computer Operating via Face Orientation"; Philippe Ballard & George C. Stockman, Pattern Recognition and Image Processing Laboratory, Computer Science Dept., Michigan State University, East Lansing, MI. IEEE, pp. 407–410, 1992.

"A Robust Algebraic Method for Human Face Recognition" Yong–Qing Cheng, Ke Liu, Jing–Yu Yang and Hua–Feng Wang, Department of Computer Science, East China Institute of Technology, Nanjing, P.R.China. IEEE, pp. 221–224, 1992.

"3–D Motion Estimation in Model–Based Facial Image Coding" Haibo Li, Student Member, IEEE, Pertti Roivainen, and Rober Forchheimer. IEEE, pp. 545–555, 1993.

"Empath: Face, Emotion, and Gender Recognition Using Holons"; Garrison W. Cottrell (Computer Science & Eng. Dept., Inst. for Neural Computation, Univ. of CA, San Diego LaJolla, CA) and Janet Metcalfe (Dept. of Psychology, Dartmouth College, Hanover, NH); Advances In Neural Information Processing, pp. 564–571, 1990.

"Human Face Recognition and the Face Image Set's Topology"; M. Bichsel and A. P. Pentland; The Media Laboratory, MIT, Cambridge, MA; CVGIP: Image Understanding, vol. 59. No. 2, pp. 254–261, 1994.

METHOD FOR LOCATING A SUBJECT'S LIPS IN A FACIAL IMAGE

BACKGROUND OF THE INVENTION

1. Field of the invention

The present invention relates to image processing, more specifically, locating features in an image.

2. Description of the Related Art

Locating facial features in an image is important in security applications for automatically identifying individuals, in speech recognition for improving recognition rates, and in low bandwidth video telecommunications. In lower bandwidth video communications, an entire image is sent or updated every 4 or 5 frames while video information relating to a speaker's mouth is sent or updated at the full frame rate. In another low bandwidth video telecommunications application, an entire image is transmitted every 4 or 5 frames and the speaker's utterances are used as inputs to a model. The model's output is used to modify the appearance of a speaker's mouth on the receiving video terminal between frame updates. All of these applications would benefit from a more accurate technique to locate facial features, such as a mouth, in an image.

In the past, facial features have been located by detecting a cornea reflection or by using templates or deformable templates. Templates were used by moving the template over an image and defining an energy function that is minimized when the template closely matches a facial feature. Theses techniques did not perform well in a natural environment. A natural environment is one in which the lighting varies and the position of a individual's face with respect to the camera varies.

SUMMARY OF THE INVENTION

The present invention provides an apparatus and method for locating facial features in an image. The present invention is tolerant of varying lighting conditions and varying camera positions. An embodiment of the present invention locates facial features in an image by bandpass filtering the image and then performing morphological operations followed by a thresholding operation. This initial processing identifies candidate areas where facial features may be located. The candidate areas are evaluated by classifiers to determine if a facial feature, such as an eye or mouth, has been located.

DETAILED DESCRIPTION

Figure 1:
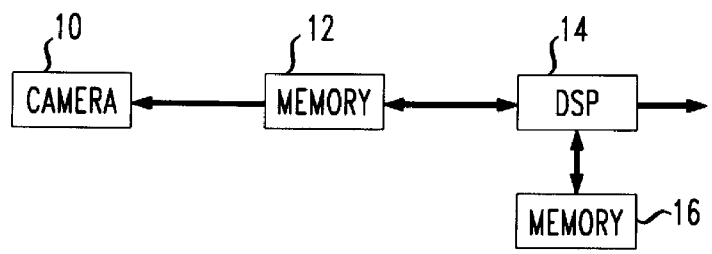
FIG. 1 illustrates a functional block diagram of an embodiment of the present invention.

FIG. 1 illustrates a functional block diagram of an apparatus to locate facial features in an image; however, the invention may be used to locate any type of feature in an image. Camera 10 provides a pixel representation of an image to memory 12. Digital signal processing device (DSP) 14 processes the image stored in memory 12 to determine the location of facial features. DSP 14 uses memory 16 for program storage and as a scratch pad memory. The pixel data provided by camera 10 may be obtained directly from camera 10 if the camera provides a digital output, or if camera 10 provides an analog output, the pixel data may be obtained by passing the analog data from camera 10 through a analog-to-digital converter. The pixel representation of the image may be a gray scale image or a color image. Memory 12 may be constructed using any of the widely available random access memories. DSP 14 may be implemented using a digital signal processing chip provided by a manufacturer such as Texas Instruments, or it may be implemented using a microprocessor or using a combination of a microprocessor and a co-processor chip. Memory 16 may be constructed using a combination of random memory access memory and read-only memory.

Figure 2:
FIG. 2 illustrates an image stored in a memory.

FIG. 2 illustrates an image captured by camera 10. The image is stored in memory 12 in the form of pixels. In the case of a gray scale image, for example, each pixel may have an intensity value between 0 and 255. A high intensity indicates a bright pixel, and a low intensity indicates a dull or dark pixel. The image of FIG. 2 may have any scale; however, this embodiment of the invention uses an image with a scale of 240 pixels in the vertical direction and 360 in the horizontal direction.

Figure 3:
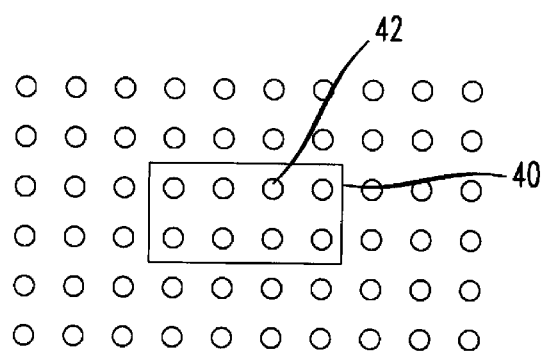
FIG. 3 illustrates convolving a shape over a plurality of pixels.

In order to locate facial features, the image is passed through a bandpass filter by convolving the image with a rectangular shape. As the image is convolved with the rectangular shape, the original image is retained in memory as a new image is constructed. FIG. 3 illustrates how an image is convolved with a rectangular shape. Rectangular shape 40 is scanned over the entire image pixel by pixel. For example, rectangular shape 40 is moved one pixel at a time in the horizontal direction until it reaches the end of the image, and then it is moved down one pixel in the vertical direction and again scanned across the image one pixel at a time in the horizontal direction. At each position, the intensities of pixels 42 contained within rectangle 40 are summed and averaged. This average is used to construct the image resulting from convolution. The intensity value of the pixel in the new image corresponding to the pixel at or near the center of the rectangle in the original image is set to the average. The pixel intensities of the original image are not changed as the new or resulting image is formed.

As mentioned earlier, the image of FIG. 2 is bandpass filtered using a rectangular shaped that is convolved with the image. This bandpass filtering is carried out in two steps. The first step involves low pass filtering the image by convolving the image with a small rectangular shape having a vertical dimension of two pixels and a horizontal dimension of one pixel. This process is carried out on the image of FIG. 2 to produce a lowpass filtered image. A copy of the lowpass filtered image is stored in memory 16 while DSP 14 performs another convolution operation on the lowpass filtered image. DSP 14 high pass filters the lowpass filtered image by convolving the lowpass filtered image with a rectangular shape having a vertical dimension of 25 pixels and horizontal a dimension of 5 pixels. The resulting highpass filtered image is subtracted from the lowpass filtered image that was stored in memory 16 to produce a bandpass filtered image which is stored in-memory 16. The subtraction is carried out by subtracting the values of pixels having corresponding positions in the images.

It should be noted that by changing the dimensions of the rectangular shape convolved with the image, the filtering characteristics in the vertical and horizontal directions are changed. For example, if the rectangle has a large vertical dimension, it tends to act as a lowpass filter in the vertical direction, and if it has a small vertical dimension, filters out less of the high frequencies. Likewise, if the rectangular element has a large horizontal dimension, it tends to act as a lowpass filter in the horizontal direction. It should also be noted that the filtering operations may be carried out using fourier transforms rather than convolution operations.

After performing the bandpass filtering operation on the image of FIG. 2, a morphological operation is performed to emphasize areas of the image that may contain facial features of interest. A morphological operation involves convolving an image with a rectangle or a shape similar to the shape of the feature to be emphasized. The rectangular shape used to convolve with the image has a vertical dimension of two pixels in a horizontal dimension of six pixels. As with the other convolution operations, the pixels within the rectangular area are summed and averaged. The intensity value of pixel in the resulting image that corresponds to the pixel at or near the center of the rectangle is given an intensity equal to the average value. After the morphological operation is performed, the morphologically processed image is analyzed to determine a threshold.

Figure 4:
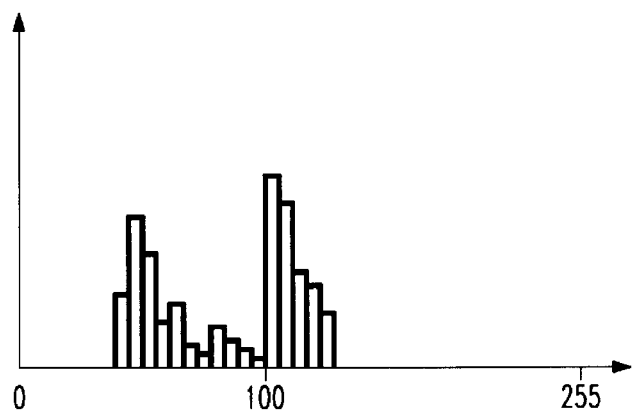
FIG. 4 illustrates a histogram of pixel intensity.
Figure 5:
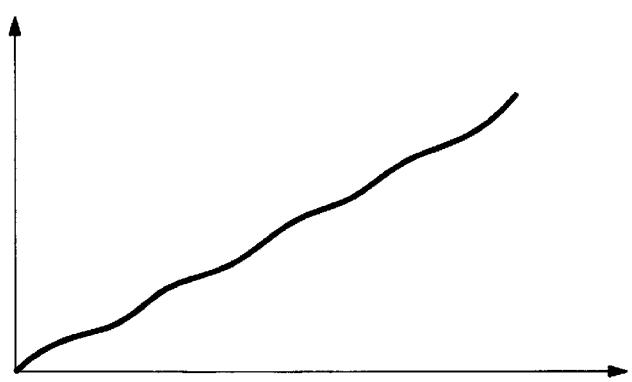
FIG. 5 illustrates a histogram of connected components of pixels.

FIG. 4 illustrates a histogram of a morphologically processed image where intensity is illustrated on an horizontal scale and the number of pixels is shown on the vertical scale. This histogram is converted to a histogram which illustrates a threshold value on the horizontal axis and the number of "connected components" on the vertical axis. FIG. 5 illustrates a connected component histogram.

Figure 6:
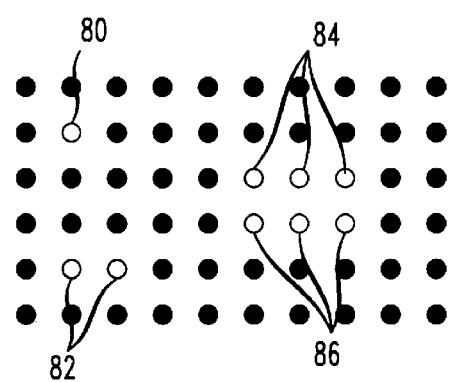
FIG. 6 illustrates connected components in a thresholded image.

The term "connected component" refers to the number of consecutive white pixels in a binary image, where the binary image is obtained by passing the morphologically processed image through a threshold process. The thresholding process involves setting a pixel to zero or dark if its intensity is below the threshold, and setting the pixel to 1 or white if the pixel's intensity is above or equal to the threshold. FIG. 6 is a portion of a binary image illustrating a connected component. A connected component of pixels may include more than a single row. For example, pixel connected components 84 and 86 constitute a connected component because they form a connected component of consecutive white pixels. Pixels 82 constitute a connected component because there are two consecutive white pixels. It should also be noted that pixel 80 constitutes a connected component because it is a connected component of connected component comprising one consecutive white pixel.

A histogram of connected components is developed by first setting the threshold to one and then counting the number of connected components in the resulting binary image. The next point in the histogram is found by setting the threshold to two and counting the number of connected components in the resulting binary image. This process is continued for each possible intensity value, in this example 255 different values, until a completed histogram is developed.

A threshold is selected by making an analysis of the resulting histogram. In reference to FIG. 5, it should be noted that if a threshold value is set particularly low, there will be a large number of white pixels in the binary image. If a large number of pixels are white, there will be less white pixels standing alone, that is, it is more likely that pixels will be in connected components without black pixels breaking up the connected component. As a result, a low threshold produces a low number of connected components. Conversely, if the threshold is set high, a large number of pixels will be set to black rather than white. If there are a large number of black pixels, connected components of white pixels are more likely to be broken up by the black pixels, and as a result, a large number of connected components are formed. It is desirable to select a threshold that produces a reasonable number of connected components that may later be identified as a facial feature. If too large a number of connected components are formed, it may be difficult to eliminate false candidates for facial features. On the other hand, if the threshold is set to low, too many connected components merge into large connected components and thereby smear or eliminate desired facial features. A threshold determined during a training procedure, to be described below, using representative images.

After the threshold is selected, the morphologically processed image is thresholded by comparing each pixel with the threshold. If the pixel's intensity is below the threshold, the pixel is set to 0 or black, and if the pixel's intensity is greater than or equal to the threshold, the pixel is set to 1 or white. This process of thresholding the image results in a binary image.

After the binary image has been formed, the connected components are examined in an attempt to identify eye candidates. Each connected component is measured to determine the connected component's height, width and aspect ratio (width/height). Each of these three parameters is compared to an ideal value and the difference between the parameter and the ideal value is multiplied by a weight and then summed to form a score for each connected component.

Equation 1 illustrates a linear classifier or a scoring process where width differences W is multiplied by weight $w_{x1}$, and then added to the product of height differences H multiplied by weight $w_{h1}$ which is summed with the product of aspect ratio differences R multiplied by aspect ratio weight $w_{r1}$ to form, eye score $S_e$. The weights and ideal value are determined during a training procedure using representative images.

$$Ww_{x1} + Hw_{h1} + Rw_{r1} = S_e \qquad \text{Equation 1}$$

Figure 7:
FIG. 7 illustrates the image of FIG. 2 after bandpass filtering, morphological processing and thresholding.

This process is carried out for each connected component in the binary image. The connected components having a score within a desirable range, as determined during training, are identified as eye candidates in the original image. FIG. 7 illustrates, the connected components that have been identified as eye candidates superimposed on the binary image.

The above referenced weights, thresholds, ideal values and scores are obtained by a training process. The training process is carried out using a set of training images where the locations of the features of interest are known. The set of training images should be similar in size and representative of the images to be processed. For example, the training set might include 20 images having an image of a person's head where each person is facing in a forward direction toward a camera and where each of the images are gray scale images. It is advisable to using a training set on the order of at least 20 images. Each of the training images is processed in the same fashion as described above. The weights and thresholds are then adjusted to maximize the ability to locate features while minimizing errors. For example, a weight is calculated by repeating the above procedure for several different weight values. At the end of each procedure the results are checked. The weight value that produced best results is selected. This process is repeated for all weights, thresholds and scores, several times, until a satisfactory result is achieved. Generally speaking, the training process is well known in the art as a method for training linear classifiers. Training linear classifiers is discussed in reference "Pattern Classification and Seen Analysis" by Duda and Hart, pages 130–188, John Wiley and Sons, Inc., 1973, New York, N.Y. It should be noted that other classifiers, such as neural networks, may be used to identify or classify the connected components.

After eye candidates have been identified, mouth candidates are identified. The mouth candidates are identified in a fashion similar to that which was used with regard to eye candidates. The height, width and aspect ratio of each of the connected components are measured and compared to an ideal value. A score is produced for each of the connected components by taking a sum of the weighted height difference and weighted aspect ratio difference. Equation 2 illustrates this scoring process. Weight $w_{x2}$ is used to weight the width difference of the connected component, weight $w_{h2}$ is used to weight the height difference of the connected component and weight $w_{r2}$ is used to weight the aspect ratio difference of the connected component.

$$Ww_{x2}+Hw_{h2}+Rw_{rw}=S_m \qquad \text{Equation 2}$$

Figure 8:
FIG. 8 illustrates candidate eye and mouth locations.

The connected components having a score within a desirable range are identified as mouth candidates. FIG. 8 illustrates the image of FIG. 2 with the eye position candidates indicated as circles and mouth position candidates indicated as lines. As described above, the weights, ideal values and desirable score range are determined by the training process.

After eye and mouth candidates have been identified, a search is made for eye pair candidates. Eye pair candidates are identified by examining all the previously identified eye candidates. All possible combinations of the eye candidates, taken two at a time, are examined to produce eye pair candidates. Each pair is examined by measuring the distance between the two eye candidates composing the eye pair under examination, by measuring the orientation of the pair of eye candidates, and by forming a sum of the scores previously calculated for each of the eye candidates composing the eye pair under examination. Equation 3 illustrates how a score is developed for an eye pair. Distance D between the eye candidates is multiplied by weight $w_{d1}$, orientation value O is multiplied by weight $w_o$, and the sum of previously calculated scores $S_{en}$ and $S_{em}$ is multiplied by weight $w_s$. These products are summed to form a score for the eye pair candidate. The eye pairs having a score within a desired range are identified as an eye pair candidate. The orientation value in equation 3 indicates how close a line connecting the two eye candidates composing the eye pair is to the horizontal.

$$Dw_{d1}+Ow_o+(S_{en}+S_{em})w_s=S_{ep} \qquad \text{Equation 3}$$

The eye pairs having scores within the desirable range are identified as eye pair candidates. As described above the weights, ideal values and desirable score range are determined by the training process.

The eye pair candidates are then used in conjunction with the previously identified mouth candidates to identify the eye and mouth positions in the image. Each combination of eye pair candidate and mouth candidate are examined. The examination involves determining the distance separating the eyes of the eye pair candidates, and calculating a mouth/eye ratio. The ratio is calculated by dividing the distance between the mouth candidate and a line interconnecting the eye candidates, by the distance between the eye candidates. The distance separating the eyes, and the mouth/eye ratio are each multiplied by a weight and then summed to form a score. Equation 4 illustrates this process. Distance D refers to the separation between the eyes of the eye pair candidate. Distance D is multiplied by weight $w_{d2}$. The product $Dw_{d2}$ is added to the product of ratio $D_{me}$ and weight $w_{me}$. Ratio $D_{me}$ is the vertical distance between a line, which interconnects the eyes of the eye pair candidate, and the mouth candidate, divided by distance D. The sum of these products form a score for each of the eye pair-mouth combinations under examination.

$$Dw_{d2}+D_{me}w_{me}=S_{em} \qquad \text{Equation 4}$$

Figure 9:
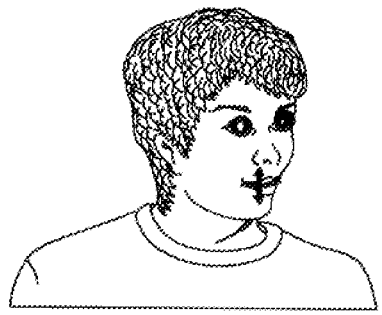
FIG. 9 illustrates an eye and mouth combination having the best score.

The scores for each combination are compared with an ideal score. The combination closest to the ideal score is identified as the combination showing the eye and mouth positions. FIG. 9 illustrates original image of FIG. 2 with the eye and mouth positions identified. As described above the weights, ideal values and desirable score range are determined by the training process.

It should be noted that if apriori knowledge exists regarding the person in the image being identified, the weights and score ranges can be specialized to identify a particular person's features. It should also be noted that if a position of a face in an image is known apriori, it is possible to eliminate many eye and mouth candidates simply based on their location within the image. If the image is part of a video, it is possible to eliminate some of the eye and mouth candidates by tracking head position or comparing two or more frames.

It is possible to provide low bandwidth telecommunications by transmitting the entire video picture at a relatively low frame rate while transmitting the portion of the image surrounding the mouth at a full frame rate. This requires identifying the position of the mouth with regard to the rest of the image, and then transmitting that portion of the image at full frame rate while transmitting the rest of the image at a lower frame rate such as every 5th frame.

In another low bandwidth video telecommunication application, it is desirable to identify lip position with as much accuracy as possible so that a morphing procedure may be used to modify the lips in the image presented to the party receiving the video image. In this way, a complete video image is transmitted every 4 or 5 frames while mouth or lip position is updated using a morphing procedure so that the image seen by the receiving party seems to be at the full frame rate. The morphing is carried out by carefully identifying the lip position on a transmitted frame, and then at the receiving end of the video transmission, modifying the lip positions based on the speaker's utterance. One of the well known models for predicting lip motion based on utterances is used to predict a mouth or lip position. Morphing is well known in the art and discussed in references such as "Digital Image Wraping", G. Wolberg, IEEE Computer Society Press, 1990, Los Altamitos, Calif.

As discussed with regard to morphing, in some applications it is not only necessary to know the position of the mouth, but it is also desirable to know the position of the lips. An embodiment of the present invention also provides a method and apparatus for finding the position of a person's lips in an image. The lips are located in a manner similar to that which was used to locate the eyes and mouth. Initially, the location of the mouth which is determined as described above. The portion of the image relating to the mouth is processed in order to determine the position of the lips and a more exact outline of the mouth. In order to minimize computational overhead, only the portion of the image associated with the mouth is processed in order to locate the lips. For example, only the portion of the image containing the mouth and a border of 5 or 10 pixels surrounding that area is used when determining the exact location of the lips.

The portion of the original image containing the mouth, is bandpass filtered as described above. The image is first lowpass filtered by convolving a rectangular shape with the image. The rectangular shape may have dimensions such as a vertical dimension of two pixels and a horizontal dimension of one pixel. A copy of the lowpass filtered image is then stored in memory 16 and DSP 14 performs another convolution operation on the lowpass filtered image. This second convolution highpass filters the lowpass filtered image by convolving the lowpass filtered image with a rectangular shape having dimensions such as a vertical dimension of 25 pixels and a horizontal dimension of 5 pixels. The resulting highpass filtered image is subtracted from the lowpass filtered image that was stored in memory 16 to produce a bandpass filtered image which is also stored in memory 16. The subtraction is carried out by subtracting the intensity values of pixels having corresponding positions in the images.

After performing the bandpass filtering operation on the portion of the image containing the mouth, a morphological operation is performed to emphasize the center of the mouth. The morphological operation involves convolving a rectangular shape with the bandpass filtered image. The rectangular shape has dimensions such as a vertical dimension of 1 pixels and a horizontal dimension of 8 pixels. After the morphological operation is performed, the morphologically processed image is analyzed to determine a threshold.

An intensity histogram of the morphologically processed image is constructed so that on a horizontal scale the number of intensity of pixels is illustrated and on the number of pixels is illustrated. As discussed earlier, a connected component histogram is developed to illustrate a threshold value on the horizontal axis and the number of connected components on the vertical axis. After making an analysis of the histogram showing connected component, a threshold is selected. The threshold is determined using the previously described training procedure.

Once the threshold is selected, the morphologically processed image is thresholded as discussed earlier to produce a binary image. The binary image results in a group of connected components that identify the mouth. These connected components identify the center of the mouth, and the left and right ends of the connected components identify the left and right edges of the mouth.

After using the connected components to identify the center of the mouth, that portion of the original image or the bandpass filtered image is processed. The image is processed by examining the vertical cross section through the middle of the mouth as identified by the connected components from the binary image. The vertical cross section is taken at the horizontal middle or position midway between the right and left edges of the mouth as identified by the left and right edges of the connected components. The cross section is taken using a strip that is on the order of 5 pixels wide. Variations in contrast or the variation in pixel intensity are examined when moving in a vertical direction within this strip. (If the strip is 5 pixels wide, the average intensity of the 5 pixels is used in the analysis.) If a large variation in intensity occurs, a simple segmentation process is used to determine the inner and outer boundaries of both the upper and lower lip. If the variation in contrast is relatively small, the vertical strip is compared with a group of stored profiles of vertical cross sections. Variations in intensity are considered large if the intensities vary over a range greater then a threshold $T_1$, which is determined using the previously described training procedure. Large variations occur typically in images where there is lipstick on the lips being located. If the variation in intensity is less then threshold $T_1$, then the profile matching method is used.

If the variation in intensity along the vertical cross section is larger then threshold $T_1$, segmentation is used. This method simply involves comparing the intensity of the pixels with a threshold $T_2$ as the examination moves in a vertical direction along the vertical cross section. Threshold $T_2$ is determined using the previously described training procedure. For example, if the scan is moving in a vertical direction from bottom to top, the intensity of the pixels are monitored, and when the intensity crosses threshold $T_2$, the outer edge of the lower lip is identified. The scan then continues in an upward direction until the intensity once again crosses the threshold to identify the inner edge of the lower lip. The scan then continues vertically until the intensity crosses the threshold to indicate the inner edge of the upper lip. The scan is then completed by continuing vertically until the in intensity crosses the threshold $T_2$ to indicate the outer edge of the upper lip.

The profile matching method involves comparing the intensity profile from the image with a collection of stored profiles or cross sections in order to find the closest match. Once the closest match is found, the inner and outer edges of both the upper and lower lips specified by that stored profile are used to identify those locations of the image under examination.

Figure 10:
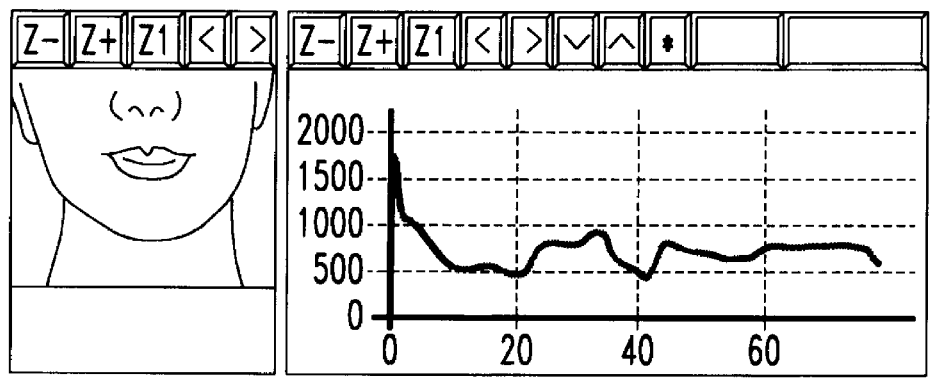
FIG. 10 and 11 illustrate stored profiles of lips.
Figure 11:
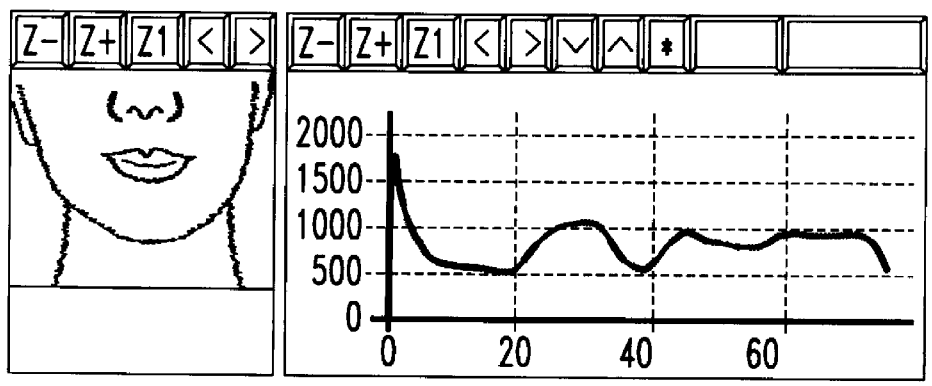

FIGS. 10 and 11 illustrate stored profiles that are used for comparison with the intensity profile under examination. The profiles indicate pixel intensity verse vertical position. Initially, before a comparison is carried out, the profile measured from the image under examination is scaled to a normalized scale that was used with the stored profiles. Normalization is easily carried out because the previously determined distance between the eyes is used to determine the scaling factor. The resulting intensity profile is similar to the profiles of FIGS. 10 and 11. The resulting profile is compared with stored profiles to find a best match. Characteristics such as maximum and minimum points on the intensity profiles are compared in order to find the best match. The profiles that are stored and used for comparison are obtained by taking known images and processing them in the same manner as the image under examination. Training images as discussed earlier should be appropriate for the problem being addressed, that is, determining the position of lips in an image. In order to provide a complete training set, the images should have lighting and positioning similar to those that are expected in images to be examined and the images should contain a variety of lip shapes, including images where the lips have lipstick on them. The images should also include images with mouths partially open, with teeth showing and with a tongue showing. In a case where a near match results in an error, that is, the position of the lips in the image being incorrectly indicated, it is advisable to add the image, with the correct lip positions, to the stored set of profiles for future comparison.

Figure 12:
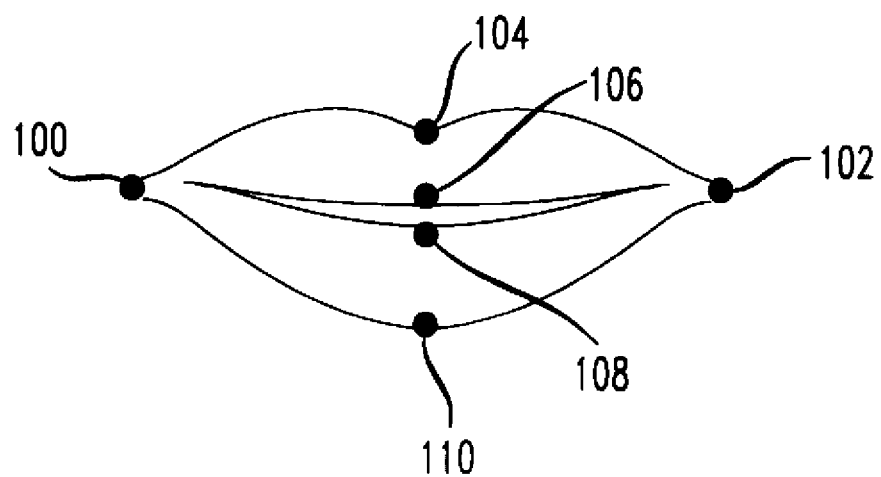
FIG. 12 illustrates six points used to identify the locations of the mouth and lips.

By using this method, the mouth and the lips are defined with 6 points. FIG. 12 illustrates a mouth where points 100 and 102 define the left and right edges of the mouth. Points 104 and 106 define the outer and inner edges of the upper lip, respectively, and points 108 and 110 define the inner and outer edge of the lower lip, respectively. Specifying these 6 points provides an accurate positioning for use in lowband video communication such as those employing the morphing method.

The invention claimed is:

1. A method for locating a subject's lips in a image, comprising the steps of:

bandpass filtering the image to produce a bandpass filtered image;

morphologically processing the bandpass filtered image to produce an enhanced image by convolving the bandpass filtered image with a rectangular shape;

thresholding the enhanced image to form a binary image having a plurality of connected components; and using a classifier to identify at least one connected component corresponding to the subject's mouth;

determining an intensity profile along a vertical strip across the image of the subject's mouth;

determining an intensity variation of the intensity profile; and comparing the intensity profile to a plurality of stored intensity profiles to locate an edge of at least one of the lips if the intensity variation is below a first threshold, and comparing the intensity profile to a second threshold to locate the edge of at least one of the lips if the intensity variation is above the first threshold.

2. The method of claim 1, wherein the step of morphologically processing comprises convolving the bandpass filtered image with a rectangular shape having vertical and horizontal dimensions similar to the subject's mouth.

3. The method of claim 1, wherein the step of bandpass filtering comprises lowpass filtering the image to produce a lowpass filtered image, highpass filtering the lowpass filtered image to produce a highpass filtered image, and subtracting the highpass filtered image from the lowpass filtered image to produce the bandpass filtered image.

4. The method of claim 1, wherein the step of using a classifier comprises using a linear classifier.

5. The method of claim 1, wherein the step of using a classifier comprises using a neural network.

6. The method of claim 1, wherein the step of bandpass filtering comprises convolving the image with a rectangular shape.

* * * * *